United States Patent
Hayama et al.

(10) Patent No.: US 9,227,657 B2
(45) Date of Patent: Jan. 5, 2016

(54) VEHICLE STEERING SYSTEM

(71) Applicant: JTEKT CORPORATION, Osaka-shi, Osaka (JP)

(72) Inventors: Ryouhei Hayama, Nabari (JP); Akihiro Takazato, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/222,891

(22) Filed: Mar. 24, 2014

(65) Prior Publication Data

US 2014/0303846 A1 Oct. 9, 2014

(30) Foreign Application Priority Data

Apr. 3, 2013 (JP) ................................. 2013-077767

(51) Int. Cl.
| | |
|---|---|
| *A01B 69/00* | (2006.01) |
| *B62D 5/04* | (2006.01) |
| *B66F 9/075* | (2006.01) |
| *B66F 9/24* | (2006.01) |
| *B62D 1/04* | (2006.01) |

(52) U.S. Cl.
CPC .............. *B62D 5/0466* (2013.01); *B62D 1/043* (2013.01); *B62D 1/046* (2013.01); *B66F 9/07568* (2013.01); *B66F 9/24* (2013.01)

(58) Field of Classification Search
CPC .......... B62D 5/00; B62D 5/04; B62D 5/0418; B62D 5/0421
See application file for complete search history.

(56) References Cited

U.S. PATENT DOCUMENTS

| | | | |
|---|---|---|---|
| 6,481,525 B1 | 11/2002 | Bloch et al. | |
| 6,484,838 B1 | 11/2002 | Børsting et al. | |
| 2003/0184072 A1* | 10/2003 | Andonian et al. | ............ 280/779 |
| 2004/0143379 A1* | 7/2004 | Borroni-Bird et al. | ......... 701/36 |
| 2007/0041817 A1* | 2/2007 | Kakinuma | ..................... 414/490 |
| 2008/0277188 A1* | 11/2008 | Hauser et al. | ................. 180/422 |
| 2011/0282550 A1* | 11/2011 | Tada et al. | ....................... 701/41 |
| 2013/0046442 A1 | 2/2013 | Hayama et al. | |

FOREIGN PATENT DOCUMENTS

| | | |
|---|---|---|
| JP | A-05-092769 | 4/1993 |
| JP | A-2008-213769 | 9/2008 |
| JP | A-2009-288872 | 12/2009 |
| JP | A-2012-001092 | 1/2012 |

OTHER PUBLICATIONS

Jul. 4, 2014 Extended European Search Report issued in European Application No. 14 16 1662.

* cited by examiner

*Primary Examiner* — Michael D Lang
(74) *Attorney, Agent, or Firm* — Oliff PLC

(57) ABSTRACT

In a vehicle steering system configured to reduce the burden placed on an operator when steered wheels are returned to a neutral position, a knob for operating a steering wheel is turnably attached to the steering wheel. A switch is attached to the knob. A steered system ECU includes a target steered angle setting unit. The target steered angle setting unit changes a target steered angle to a steered angle corresponding to a position closer to the neutral position of the steered wheels when the switch is turned on in a state where the turning amount of the steering wheel from a turning angle of the steering wheel corresponding to the neutral position of the steered wheels is within a prescribed range.

21 Claims, 5 Drawing Sheets

VEHICLE STEERING SYSTEM

INCORPORATION BY REFERENCE

The disclosure of Japanese Patent Application No. 2013-077767 filed on Apr. 3, 2013 including the specification, drawings and abstract is incorporated herein by reference in its entirety.

BACKGROUND OF THE INVENTION

1. Field of the Invention

The invention relates to a vehicle steering system in which there is no mechanical connection between a steering member operated for steering and a steering mechanism, and in which the steering mechanism is driven by a steered system motor.

2. Description of the Related Art

As a vehicle steering system, there has been proposed a steer-by-wire system in which there is no mechanical connection between a steering wheel that serves as a steering member and a steering mechanism, the turning angle of the steering wheel is detected by an angle sensor, and driving force generated by a steered system motor controlled based on an output from the angle sensor is transmitted to the steering mechanism. In such a steer-by-wire system, because there is no mechanical connection between the steering wheel and the steering mechanism, it is possible to prevent upthrust of the steering wheel in the event of a vehicle collision and it is possible to simplify the configuration of the steering mechanism and to reduce the weight of the vehicle. The flexibility in the arrangement of the steering wheel is increased. Further, operational components other than a steering wheel, such as a lever and a pedal, may be adopted. As described in Japanese Patent Application Publication No. 2012-1092 (JP 2012-1092 A), Japanese Patent Application Publication No. 2009-288872 (JP 2009-288872 A), Japanese Patent Application Publication No. 2008-213769 (JP 2008-213769 A), and Japanese Patent Application Publication No. 5-92769 (JP 5-92769 A), a steer-by-wire system is adopted in a material handling vehicle such as a forklift.

In a material handling vehicle such as a forklift in which a steer-by-wire system is adopted, the turning angle range of a steering wheel is larger than that of general vehicles. For example, in the material handling vehicle, the steering wheel may be turned by one turn or more to turn the vehicle. Therefore, in the material handling vehicle, an operation of returning steered wheels to the neutral position after turning the vehicle may place a heavy burden on an operator. This takes place also in general vehicles other than material handling vehicles in varying degrees.

SUMMARY OF THE INVENTION

One object of the invention is to provide a vehicle steering system configured to reduce the burden placed on an operator when steered wheels are returned to the neutral position.

A vehicle steering system according to an aspect of the invention includes: a switch used to return a steered angle of steered wheels to a neutral position; a steering angle sensor that detects a steering angle of a steering member; and a motor controller that controls a steered system motor based on the steering angle detected by the steering angle sensor and an output signal from the switch. In the vehicle steering system, there is no mechanical connection between the steering member operated for steering and a steering mechanism that changes the steered angle of the steered wheels, and the steering mechanism is driven by the steered system motor. The motor controller includes a neutral position return controller that controls the steered system motor such that the steered angle of the steered wheels is changed toward a steered angle corresponding to the neutral position of the steered wheels when the switch is operated in a state where a turning amount of the steering member from a turning angle of the steering member corresponding to the neutral position of the steered wheels is within a prescribed range.

In the above aspect, the steered system motor is controlled such that the steered angle of the steered wheels is changed toward a steered angle corresponding to the neutral position of the steered wheels, when the switch is operated in a state where a turning amount of the steering member from a turning angle of the steering member corresponding to the neutral position of the steered wheels is within a prescribed range. Thus, the operation for returning the steered wheels to the neutral position is facilitated. As a result, it is possible to reduce the burden placed on the operator when the steered wheels are returned to the neutral position.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
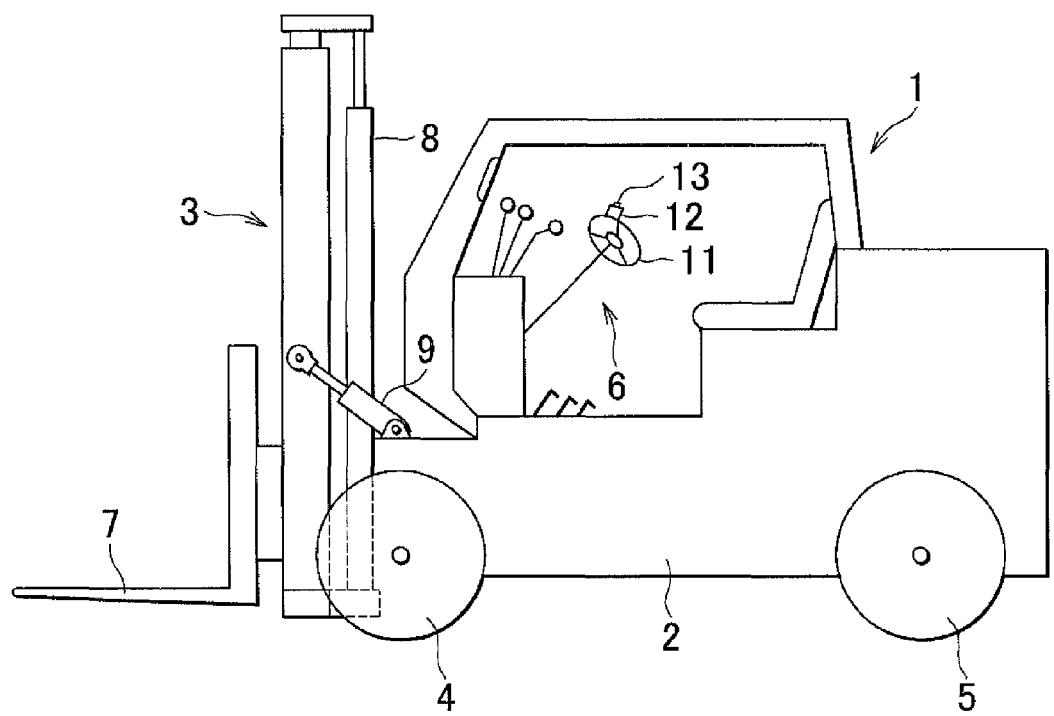
FIG. 1 is a view schematically illustrating the configuration of a forklift to which a vehicle steering system according to an embodiment of the invention is applied.

Hereinafter, example embodiments of the invention will be described with reference to the accompanying drawings. FIG. 1 is a view schematically illustrating the configuration of a forklift 1 that is a material handling vehicle to which a vehicle steering system according to an embodiment of the invention is applied. The forklift 1 includes a vehicle body 2, a material handling device 3 disposed at the front of the vehicle body 2, front wheels 4 that serve as drive wheels and support the vehicle body 2, rear wheels 5 that serve as steered wheels and support the vehicle body 2, and a vehicle steering system 6 that steers the rear wheels 5.

Although not illustrated in FIG. 1, the forklift 1 further includes a drive source for the vehicle, such as an engine, and a hydraulic pump that serves as a hydraulic power source. The power generated by the drive source is transferred to a transmission, which performs a forward-backward movement switching operation and a gear shifting operation, via a torque converter, and is then transmitted to the right and left front wheels 4 via a differential. A forward clutch and a reverse clutch are incorporated in the transmission.

As is well known, the material handling device 3 includes forks 7 supported so as to be movable up and down and tiltable relative to the vehicle body 2, lift cylinders 8 used to move the forks 7 up and down, and tilt cylinders 9 used to tilt the forks 7. The forks 7 are members on which a cargo is placed. The vehicle steering system 6 is a so-called steer-by-wire system in which there is no mechanical connection between a steering wheel 11, which serves as a steering member, and a steering mechanism that changes the steered angle of the rear wheels 5, which serve as the steered wheels. A knob 12 used to operate the steering wheel 11 is turnably attached to the steering wheel 11. The knob 12 is provided with a switch 13 used to return the steered angle of the rear wheels 5 toward a steered angle corresponding to the neutral position. In the present embodiment, the switch 13 is an automatic-return push-button switch.

Figure 2:
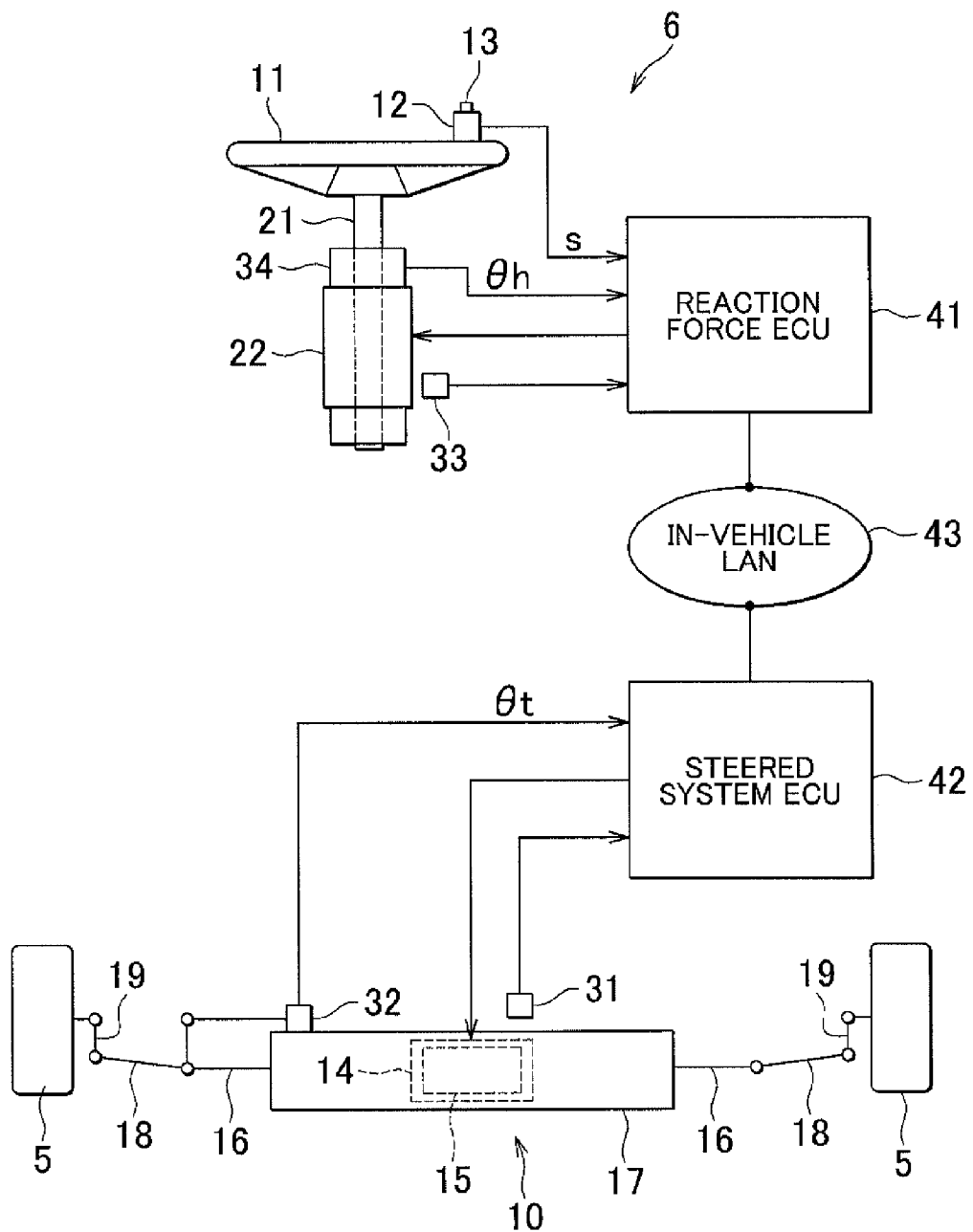
FIG. 2 is a schematic diagram illustrating the configuration of the vehicle steering system.

FIG. 2 is a schematic diagram illustrating the configuration of the vehicle steering system 6. In the vehicle steering system 6, a steered system motor 14 is driven in response to a turning operation of the steering wheel 11 and an operation of the switch 13. The rear wheels 5 are steered by converting the rotary motion of a rotor of the steered system motor 14 into a linear motion (linear motion in the right-left direction of the vehicle body 2) of a steered shaft 16 and then converting the linear motion of the steered shaft 16 into a steered motion of the rear wheels 5.

The steered shaft 16 is movably attached to a housing 17 attached to the vehicle body 2 so as to extend in the axial direction (the right-left direction relative to the vehicle body 2) of the housing 17. The steered system motor 14 is disposed so as to be coaxial with the steered shaft 16 and is incorporated in the housing 17. In the present embodiment, a brushless motor is adopted as the steered system motor 14. The steered system motor 14 is provided with a rotation angle sensor 31, such as a resolver, which detects a rotation angle of the rotor of the steered system motor 14.

A motion conversion mechanism 15 that converts the rotary motion of the steered system motor 14 into a linear motion in the axial direction of the steered shaft 16 is disposed in the housing 17. The motion conversion mechanism 15 is, for example, a ball screw mechanism. The motion of the steered shaft 16 is transmitted to the rear wheels 5 via tie rods 18 and knuckle arms 19 to change the toe angle (steered angle) of the rear wheels 5. That is, the steered system motor 14, the motion conversion mechanism 15, the steered shaft 16, the tie rods 18, and the knuckle arms 19 constitute a steering mechanism 10.

In the present embodiment, the steered angle of the rear wheels 5 is changed in such a direction that the vehicle is turned to the left (left steering direction) when the steered system motor 14 rotates in the forward rotation direction, and the steered angle of the rear wheels 5 is changed in such a direction that the vehicle is turned to the right (right steering direction) when the steered system motor 14 rotates in the reverse rotation direction. The wheel alignment is set such that the rear wheels 5 are returned to the steered positions, at which the vehicle travels straight ahead, by self-aligning torque when the steered system motor 14 is not driven.

A steered angle sensor 32 that detects a rudder angle of the vehicle, that is, a steered angle θt of the rear wheels 5 is attached to the housing 17. The steered angle sensor 32 is, for example, a potentiometer that detects a displacement of the steered shaft 16 corresponding to the steered angle θt. In the present embodiment, the steered angle sensor 32 detects an amount of change in the steered angle of the rear wheels 5 from the neutral position (the steered angle at which the vehicle travels straight ahead) of the rear wheels 5, as the steered angle θt. In the present embodiment, an amount of change in the steered angle of the rear wheels 5 in the left steering direction from the neutral position is output, for example, as a positive value, and an amount of change in the steered angle of the rear wheels 5 in the right steering direction from the neutral position is output, for example, as a negative value.

The steering wheel 11 is connected to the rotary shaft 21 rotatably supported by the vehicle body 2. A reaction force motor 22 is disposed around the rotary shaft 21. By applying rotary torque from the reaction force motor 22 to the rotary shaft 21, reaction torque (operation reaction force) is applied to the steering wheel 11. The reaction force motor 22 is disposed so as to be coaxial with the rotary shaft 21. In the present embodiment, a brushless motor is adopted as the reaction force motor 22. The reaction force motor 22 is provided with a rotation angle sensor 33, such as a resolver, which detects a rotation angle (rotor angle) of a rotor of the reaction force motor 22.

A steering angle sensor 34 that detects a steering angle (turning angle) θh of the steering wheel 11, that is, the rotation angle of the rotary shaft 21 is disposed around the rotary shaft 21. In the present embodiment, the steering angle sensor 34 detects an amount of rotation (rotation angle) of the rotary shaft 21 in the forward rotation direction and the reverse rotation direction from a prescribed reference angle. The steering angle sensor 34 outputs an amount of rotation in the left steering direction from the reference angle, for example, as a positive value, and outputs an amount of rotation in the right steering direction from the reference angle, for example, as a negative value. As will be described later, in the present embodiment, because the rotation angle of the rotary shaft 21 corresponding to the neutral position (θt=0) of the rear wheels 5 may vary, the prescribed reference angle of the rotary shaft 21 does not always correspond to the neutral position of the rear wheels 5.

The rotation angle sensor 33, the steering angle sensor 34, and the switch 13 are connected to a reaction force electronic control unit 41. Hereinafter, the electronic control unit will be referred to as "ECU". The rotation angle sensor 31 and the steered angle sensor 32 are connected to a steered system ECU 42. The reaction force ECU 41 and the steered system ECU 42 are connected to each other via an in-vehicle LAN 43. An output signal from the steering angle sensor 34 and an output signal s from the switch 13 are provided also to the steered system ECU 42 via the reaction force ECU 41 and the in-vehicle LAN 43.

Figure 3:
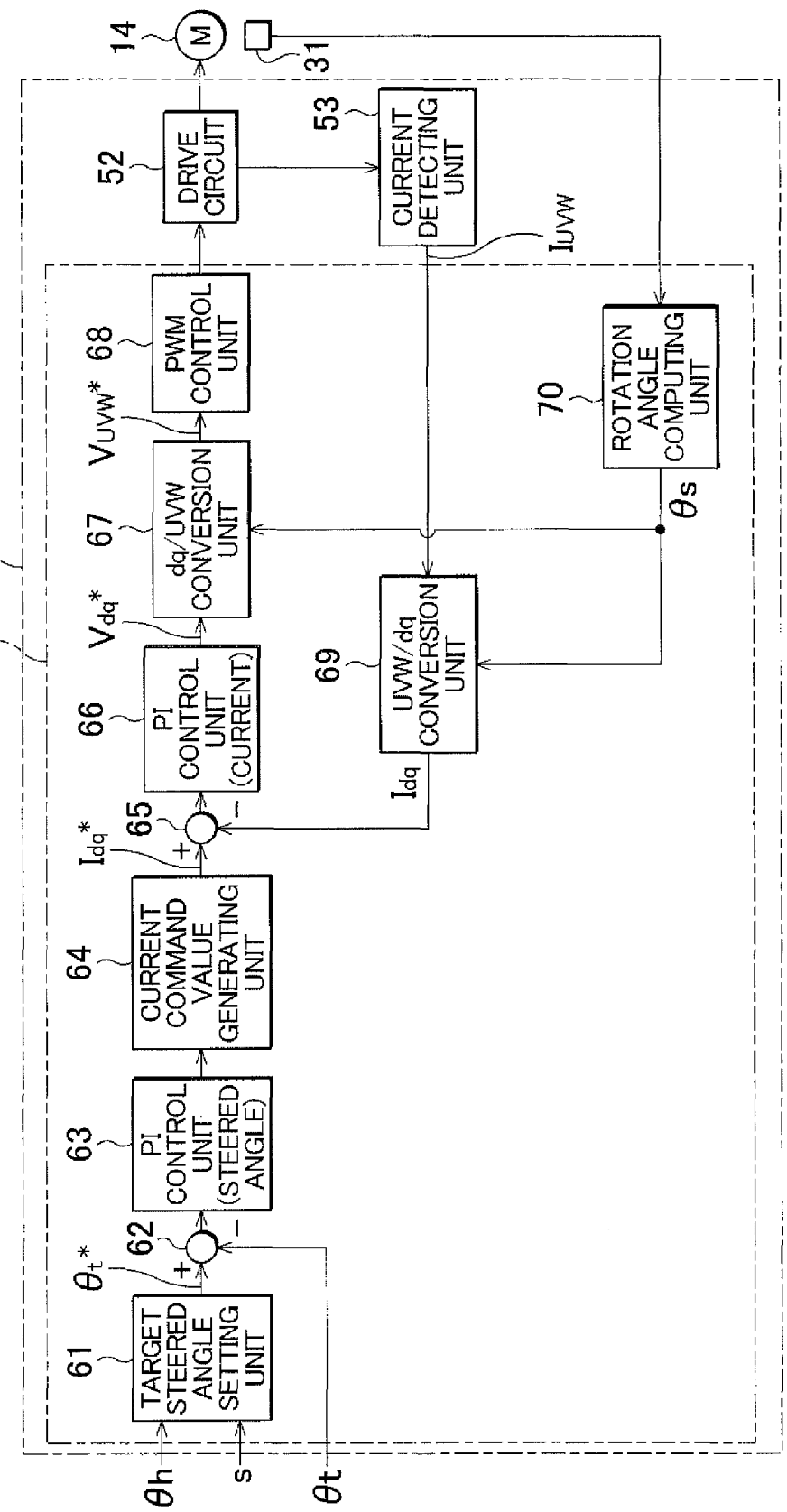
FIG. 3 is a block diagram illustrating the electrical configuration of a steered system ECU.

The steered system ECU 42 executes drive control on the steered system motor 14 on the basis of the output signals from the switch 13, the steering angle sensor 34, the steered angle sensor 32, and the rotation angle sensor 31. FIG. 3 is a block diagram illustrating the electrical configuration of the steered system ECU 42. The steered system ECU 42 includes a microcomputer 51, a drive circuit (inverter circuit) 52 that is controlled by the microcomputer 51 to supply electric power to the steered system motor 14, and a current detecting unit 53 that detects a motor current that is applied to the steered system motor 14.

Figure 4:
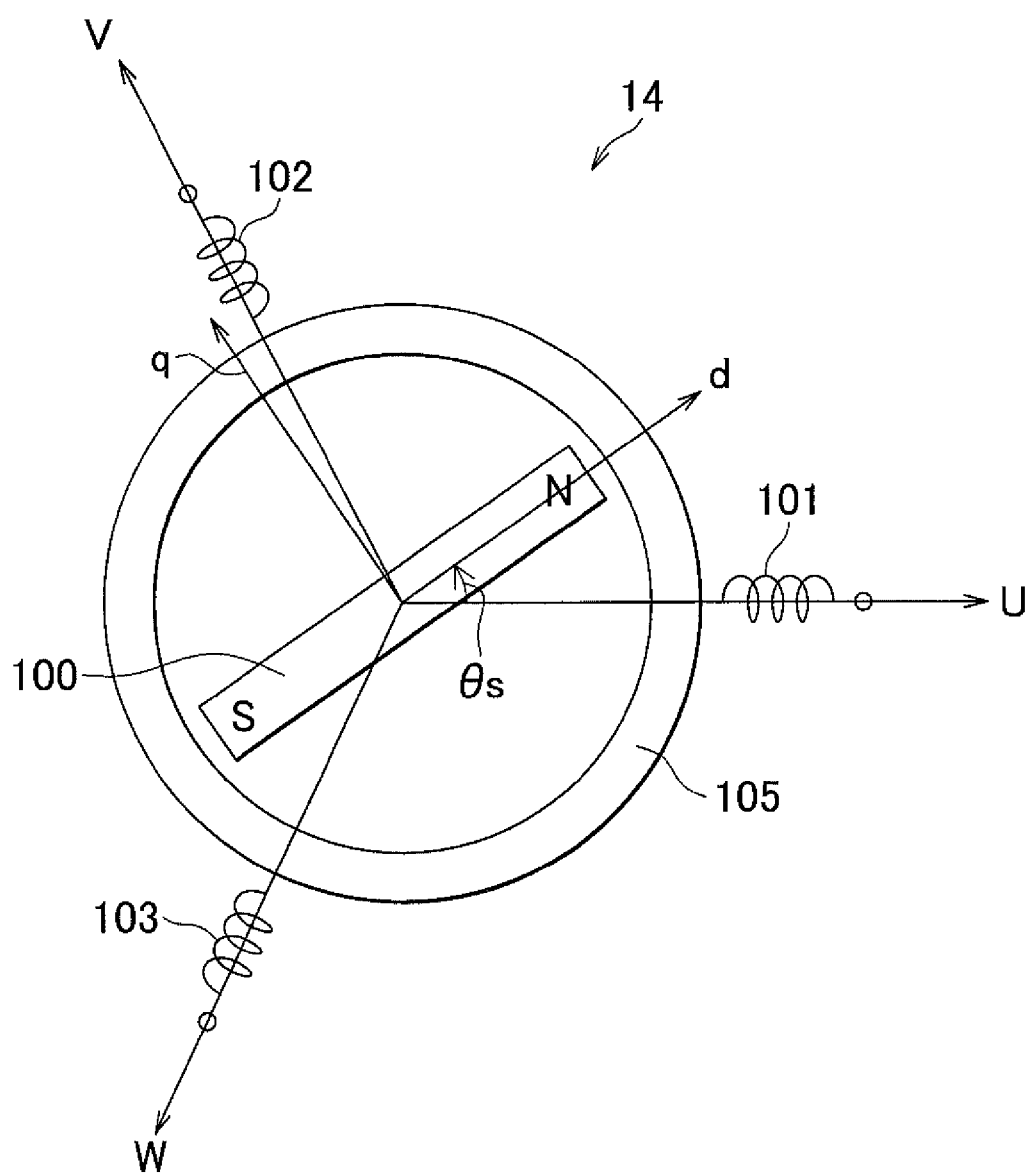
FIG. 4 is a schematic view illustrating the configuration of a steered system motor.

The steered system motor 14 is, for example, a three-phase brushless motor, and includes a rotor 100 that serves as a field magnet and a stator 105 provided with a U-phase stator coil 101, a V-phase stator coil 102, and a W-phase stator coil 103, as schematically illustrated in FIG. 4. The steered system motor 14 may be an inner rotor type motor in which a stator is disposed radially outward of a rotor so as to face the rotor or may be an outer rotor type motor in which a stator is disposed inside a cylindrical rotor so as to face the rotor.

There is defined a three-phase fixed coordinate system (UVW coordinate system) having a U-axis, a V-axis, and a W-axis, which extend in the directions of the U-phase stator coil 101, the V-phase stator coil 102, and the W-phase stator coil 103, respectively. In addition, there is defined a two-phase rotating coordinate system (dq coordinate system, actual rotating coordinate system) having a d-axis (an axis of a magnetic pole) that extends in a magnetic pole direction of the rotor 100 and having a q-axis (torque axis) that extends in a direction perpendicular to the d-axis in a rotary plane of the rotor 100. The dq coordinate system is a rotating coordinate system that rotates together with the rotor 100. In the dq coordinate system, because only a q-axis current contributes to generation of torque of the rotor 100, the d-axis current is set to zero and the q-axis current is controlled depending on the desired torque. A rotor angle θs indicating the rotational phase of the rotor 100 is an electrical angle of the d-axis with respect to the U-axis. The dq coordinate system is a rotating coordinate system based on the rotor angle θs. By using the rotor angle θs, coordinate conversion between the UVW coordinate system and the dq coordinate system is carried out.

The microcomputer 51 includes a CPU and memories (such as a ROM, a RAM, and a nonvolatile memory), and serves as multiple function processing units by executing prescribed programs. The multiple function processing units include a target steered angle setting unit 61, an angle deviation computing unit 62, a proportional-integral (PI) control unit 63, a current command value generating unit 64, a current deviation computing unit 65, a proportional-integral (PI) control unit 66, a dq/UVW conversion unit 67, a pulse width modulation (PWM) control unit 68, a UVW/dq conversion unit 69, and a rotation angle computing unit 70.

The rotation angle computing unit 70 computes a rotor angle θs of the steered system motor 14 on the basis of an output signal from the rotation angle sensor 31. The target steered angle setting unit 61 sets a target steered angle θt* on the basis of a detected steering angle θh detected by the steering angle sensor 34 and an output signal s from the switch 13. The details of the operation of the target steered angle setting unit 61 will be described later. The target steered angle θt* set by the target steered angle setting unit 61 is provided to the angle deviation computing unit 62.

The angle deviation computing unit 62 computes a deviation between the target steered angle θt* set by the target steered angle setting unit 61 and a steered angle θt detected by the steered angle sensor 32. The PI control unit 63 executes PI computation on the angle deviation computed by the angle deviation computing unit 62. The current command value generating unit 64 generates a current value, which is a value of current that should be applied to each of the d-axis and the q-axis of the dq coordinate system, as a current command value on the basis of the result of computation executed by the PI control unit 63. Specifically, the current command value generating unit 64 generates a d-axis current command value $I_d^*$ and a q-axis current command value $I_q^*$. Hereinafter, these current command values may be collectively referred to as two-phase current command values $I_{dq}^*$. More specifically, the current command value generating unit 64 generates the q-axis current command value $I_q^*$ and sets the d-axis current command value $I_d^*$ to zero. The two-phase command values $I_{dq}^*$ generated by the current command value generating unit 64 are provided to the current deviation computing unit 65.

The current detecting unit 53 detects a U-phase current $I_U$, a V-phase current $I_V$, and a W-phase current $I_W$ for the steered system motor 14. Hereinafter, these currents may be collectively referred to as three-phase detected currents $I_{UVW}$. The three-phase detected currents $I_{UVW}$ detected by the current detecting unit 53 are provided to the UVW/dq conversion unit 69. The UVW/dq conversion unit 69 converts the three-phase detected currents $I_{UVW}$ in the UVW coordinate system detected by the current detecting unit 53 into two-phase detected currents $I_d$, $I_q$ in the dq coordinate system. Hereinafter, these currents may be collectively referred to as two-phase detected currents $I_{dq}$. The two-phase detected currents $I_{dq}$ are provided to the current deviation computing unit 65. The rotor angle θs computed by the rotation angle computing unit 70 is used for the coordinate conversion in the UVW/dq conversion unit 69.

The current deviation computing unit 65 computes deviations between the two-phase current command values $I_{dq}^*$ generated by the current command value generating unit 64 and the two-phased detected currents $I_{dq}$ provided by the UVW/dq conversion unit 69. More specifically, the current deviation computing unit 65 computes a deviation of the d-axis detected current $I_d$ from the d-axis current command value $I_d^*$ and a deviation of the q-axis detected current $I_q$ from the q-axis current command value $I_q^*$. These deviations are provided to the PI control unit 66.

The PI control unit 66 generates two-phase voltage command values $V_{dq}^*$ (a d-axis voltage command value $V_d^*$ and a q-axis voltage command value $V_q^*$), which are values of voltages that should be applied to the steered system motor 14, by executing the PI computation on the current deviations computed by the current deviation computing unit 65. The two-phase voltage command values $V_{dq}^*$ are provided to the dq/UVW conversion unit 67. The dq/UVW conversion unit 67 converts the two-phase voltage command values $V_{dq}^*$ into three-phase voltage command values $V_{UVW}^*$. The rotor angle θs computed by the rotation angle computing unit 70 is used for the coordinate conversion. The three-phase voltage command values $V_{UVW}^*$ include a U-phase voltage command value $V_U^*$, a V-phase voltage command value $V_V^*$, and a W-phase voltage command value $V_W^*$. The three-phase voltage command values $V_{UVW}^*$ are provided to the PWM control unit 68.

The PWM control unit 68 generates a U-phase PWM control signal, a V-phase PWM control signal, and a W-phase PWM control signal having duty ratios respectively corresponding to the U-phase voltage command value $V_U^*$, the V-phase voltage command value $V_V^*$, and the W-phase voltage command value $V_W^*$, and provides the generated PWM control signals to the drive circuit 52. The drive circuit 52 is a three-phase inverter circuit with the U-phase, the V-phase, and the W-phase. By controlling power elements that constitute the inverter circuit on the basis of the PWM control signals provided by the PWM control unit 68, the voltages corresponding to the three-phase voltage command values $V_{UVW}^*$ are applied to the U-phase stator coil 101, the V-phase stator coil 102, and the W-phase stator coil 103 of the steered system motor 14, respectively.

The angle deviation computing unit 62 and the PI control unit 63 constitute an angle feedback controller. The steered angle θt of the rear wheels 5 is controlled so as to approach the target steered angle θt* by the angle feedback controller. The current deviation computing unit 65 and the PI control unit 66 constitute a current feedback controller. The motor currents applied to the steered system motor 14 are controlled so as to approach the two-phase current command values $I_{dq}^*$ generated by the current command value generating unit 64 by the current feedback controller.

Next, the operation of the target steered angle setting unit 61 will be described. In the present embodiment, the switch 13 is provided to facilitate the operation for returning the rear wheels 5 to the neutral position when the steering wheel 11 is turned by a prescribed turning amount or more, for example, during turning of the forklift 1. When the amount by which the steering wheel 11 is turned from the turning angle of the steering wheel 11 corresponding to the neutral position of the rear wheels 5 is within a prescribed range, if the switch 13 is turned on, the target steered angle setting unit 61 changes the target steered angle θt* to a value closer to the steered angle corresponding to the neutral position of the rear wheels 5. Thus, the rear wheels 5 are steered toward the neutral position. As a result, the operation for returning the rear wheels 5 to the neutral position is facilitated.

Figure 5:
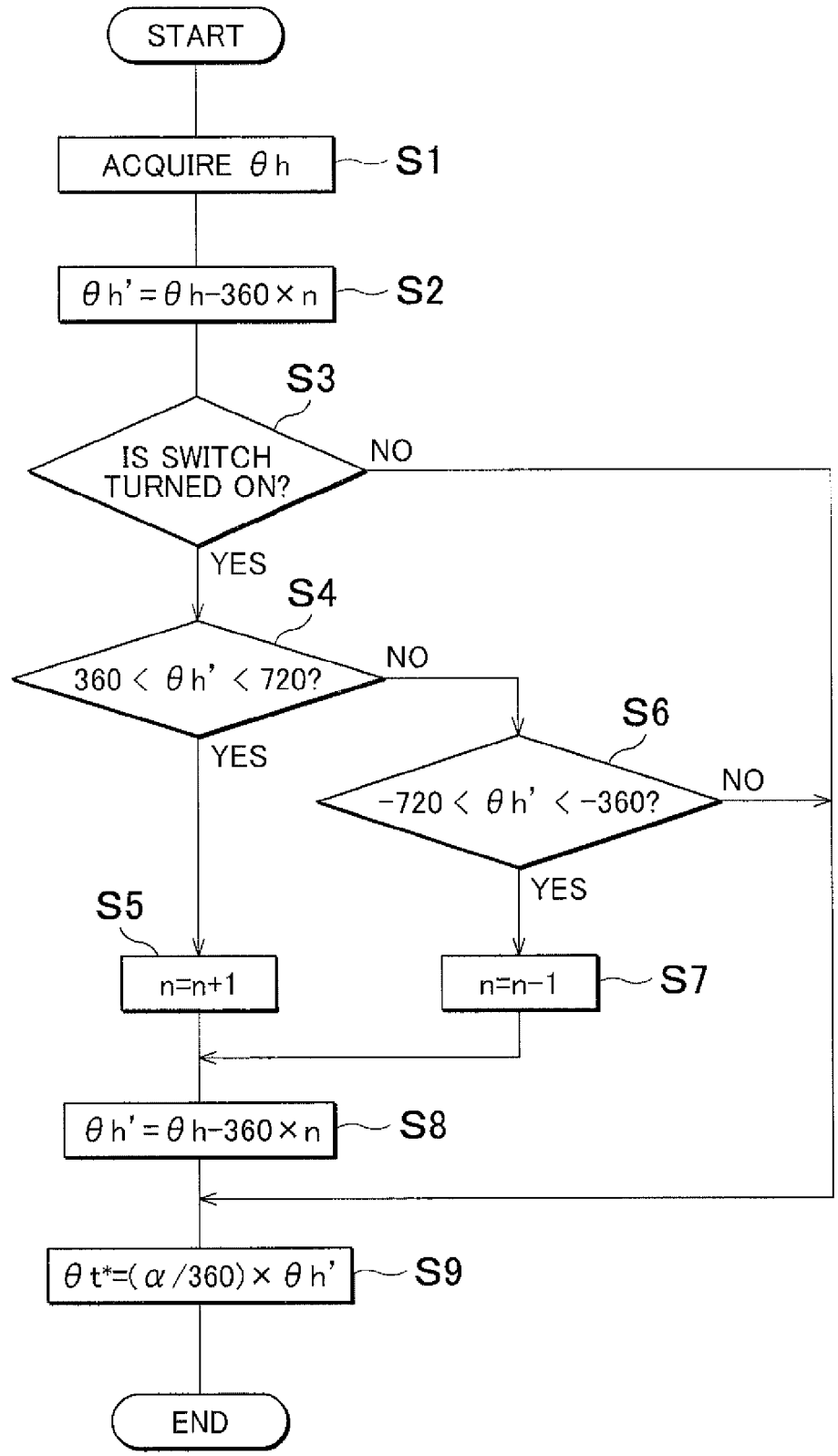
FIG. 5 is a flowchart illustrating the operation of a target steered angle setting unit.

FIG. 5 is a flowchart illustrating the operation of the target steered angle setting unit 61. The process in FIG. 5 is repeatedly executed with prescribed computation period. First, the target steered angle setting unit 61 acquires a detected steering angle θh detected by the steering angle sensor 34 (step S1).

Next, the target steered angle setting unit 61 computes a control steering angle θh' according to Expression (1) (step S2).

$$\theta h'=(\theta h-360\times n) \quad \text{Expression (1)}$$

In Expression (1), n is a variable that is changed in step S5 or S7 (described later), and the initial value of the variable n is zero. The control steering angle θh' is a steering angle used to compute the target steered angle θt*. The control steering angle θh' is equal to the detected steering angle θh detected by the steering angle sensor 34 when the variable n is zero, but is different from the detected steering angle θh when the variable n is not equal to zero. When the control steering angle θh' is different from the detected steering angle θh and the target steered angle θt* is computed on the basis of the control steering angle θh', the rotation angle of the rotary shaft 21 (the turning angle of the steering wheel 11) corresponding to the neutral position (θt=0) of the rear wheels 5 is different from the reference angle of the rotary shaft 21.

Then, the target steered angle setting unit 61 determines whether the switch 13 is turned on (step S3). When it is determined that the switch 13 is not turned on (NO in step S3), the target steered angle setting unit 61 proceeds on to step S9. In step S9, the target steered angle setting unit 61 computes the target steered angle θt* according to Expression (2). Then, the process in the present computation period ends.

$$\theta t^*=(\alpha/360)\times\theta h' \quad \text{Expression (2)}$$

In Expression (2), α is a prescribed positive value. The target steered angle θt* when the control steering angle θh' is a positive value is set to a positive value, and the target steered angle θt* when the control steering angle θh' is a negative value is set to a negative value. The target steered angle θt* is proportional to the control steering angle θh'.

Because the target steered angle θt* is computed according to Expression (2), the control steering angle θh' coincides with a value corresponding to the amount of rotation of the rotary shaft 21 relative to the rotation angle of the rotary shaft 21 (the turning angle of the steering wheel 11) corresponding to the neutral position (θt=0) of the rear wheels 5 regardless of the value of the variable n. When it is determined in step S3 that the switch 13 is turned on (YES in step S3), the target steered angle setting unit 61 determines whether the control steering angle θh' is within a range 360°<θh'<720° (step S4). When it is determined that the control steering angle θh' is out of the range 360°<θh'<720° (NO in step S4), the target steered angle setting unit 61 determines whether the control steering angle θh' is within a range 720°<θh'<−360° (step S6). When it is determined that the control steering angle θh' is out of the range −720°<θh'<360° (NO in step S6), the target steered angle setting unit 61 computes the target steered angle θt* according to Expression (2) (step S9). Then, the process in the present computation period ends.

When it is determined in step S4 that the control steering angle θh' is within the range 360°<θh'<720° (YES in step S4), the target steered angle setting unit 61 determines that the switch 13 is turned on in a state where the steering wheel 11 is operated by a turning amount that is larger than one turn and smaller than two turns in the positive direction (left steering direction) from the turning angle of the steering wheel 11 corresponding to the neutral position of the rear wheels 5. Then, the target steered angle setting unit 61 proceeds on to step S5.

In step S5, the target steered angle setting unit 61 increases the variable n by one. Then, the target steered angle setting unit 61 proceeds on to step S8. The target steered angle setting unit 61 computes the control steering angle θh' according to Expression (1) in step S8. Thus, the control steering angle θh' is changed to a value smaller than the control steering angle θh' in the immediately preceding computation period. Then, the target steered angle setting unit 61 computes the target steered angle θt* according to Expression (2) in step S9. Thus, the target steered angle θt* is changed to a value closer to zero than the target steered angle θt* in the immediately preceding computation period. As a result, the steered system motor 14 is controlled in such a direction that the steered angle θt approaches zero. Then, the process in the present computation period ends.

When it is determined in step S6 that the control steering angle θh' is within the range −720°<θh'<−360° (YES in step S6), the target steered angle setting unit 61 determines that the switch 13 is turned on in a state where the steering wheel 11 is operated by a turning amount that is larger than one turn and smaller than two turns in the negative direction (right steering direction) from the turning angle of the steering wheel 11 corresponding to the neutral position of the rear wheels 5. Then, the target steered angle setting unit 61 proceeds on to step S7.

In step S7, the target steered angle setting unit 61 decreases the variable n by one. Then, the target steered angle setting unit 61 proceeds on to step S8. In step S8, the target steered angle setting unit 61 computes the control steering angle θh' according to Expression (1). Thus, the control steering angle θh' is changed to a value larger than the control steering angle θh' in the immediately preceding computation period. Then, the target steered angle setting unit 61 computes the target steered angle θt* according to Expression (2) in step S9. Thus, the target steered angle θt* is changed to a value closer to zero than the target steered angle θt* in the immediately preceding computation period. As a result, the steered system motor 14 is controlled in such a direction that the steered angle θt approaches zero. Then, the process in the present computation period ends.

When the variable n is zero that is the initial value and the switch 13 is not turned on at all, the control steering angle θh' coincides with the detected steering angle θh. Therefore, the target steered angle θt* is computed according to an expression, θt*=(α/360)×θh. When the variable n is zero that is the initial value, an operator turns on the switch 13 in a state where the steering wheel 11 is rotated in the positive direction (left steering direction) by, for example, 380° from the turning angle of the steering wheel 11 corresponding to the neutral position of the rear wheels 5, that is, the reference angle. In this case, the detected steering angle θh is 380° and the control steering angle θh' is also 380°, an affirmative determination is made in each of step S3 and step S4. Then, in step S5, the value of the variable n is updated from zero to one. Then, in step S8, the control steering angle θh' is changed. Because the value of the variable n is updated to one, the control steering angle θh' is expressed as θh'=θh−360=20°.

Thus, the target steered angle θt* computed in step S9 is expressed as θt*=(α/360)×20. That is, the target steered angle θt* is smaller than the target steered angle expressed as θt*=(α/360)×380 when the switch 13 is not turned on.

Thus, even when the operator does not operate the steering wheel 11, the steered system motor 14 is controlled in such a direction that the steered angle θt approaches zero. As a result, the operation for returning the rear wheels 5 to the neutral position is facilitated. Thus, the burden placed on the operator when the rear wheels 5 are returned to the neutral position is reduced. In the subsequent computation period, the detected steering angle θh is acquired in step S1. If the steering wheel 11 is not operated between the immediately preceding computation period and the present computation period, the detected steering angle θh is maintained at 380°. Then, the control steering angle θh' is computed in step S2. In this case, because the variable n is one, the control steering angle θh' is equal to 20°. Then, target steered angle setting unit 61 proceeds on to step S3. When the switch 13 is off at this time, the target steered angle setting unit 61 proceeds on to step S9. Even when the switch 13 is not off, the control steering angle θh' is 20° and thus a negative determination is made in each of step S4 and step S6. Therefore, the target steered angle setting unit 61 proceeds on to step S9. In step S9, the target steered angle θt* is computed. In this case, the target steered angle θt* is expressed as θt*=(α/360)×20. Then, the operator operates the steering wheel 11 to return the rear wheels 5 to the neutral position. At this time, when the operator turns the steering wheel 11 by 20°, the rear wheels 5 are returned to the neutral position. Thus, the burden placed on the operator when the rear wheels 5 are returned to the neutral position is reduced.

The control steering angle θh' computed by the target steered angle setting unit 61 is provided to the reaction force ECU 41 via the in-vehicle LAN 43. Specifically, each time the control steering angle θh' is computed in step S2 in FIG. 5, the computed control steering angle θh' is provided from the steered system ECU 42 to the reaction force ECU 41 via the in-vehicle LAN 43. The reaction force ECU 41 computes a target reaction torque, for example, on the basis of the control steering angle θh' provided by the steered system ECU 42, and executes drive control on the reaction force motor 22 such that the computed target reaction torque is generated by the reaction force motor 22.

While one embodiment of the invention has been described above, the invention may be implemented in various other embodiments. For example, in the above-described embodiment, the target steered angle θt* is changed when the switch 13 is turned on in the case where the control steering angle θh' is within the range 360°<θh'<720° or within the range −720°<θh'<−360°. That is, the target steered angle θt* is changed when the switch 13 is turned on in the case where the turning amount of the steering wheel 11 from the turning angle of the steering wheel 11 corresponding to the neutral position of the rear wheels 5 is larger than one turn and smaller than two turns. However, the range of angles is not limited to the above-described ranges, and another range of angles may be adopted.

In the above-described embodiment, the switch 13 is disposed on the knob 12. However, the switch 13 may be disposed at any position at which the operator is able to operate the switch 13 in the forklift 1. A push-button switch is used as the switch 13 in the above-described embodiment. Alternatively, a sensor such as a strain sensor or an electrostatic sensor may be used as the switch 13.

What is claimed is:

1. A vehicle steering system comprising:
   a switch used to return a steered angle of steered wheels to a neutral position;
   a steering angle sensor that detects a steering angle of a steering member; and
   a motor controller that controls a steered system motor based on the steering angle detected by the steering angle sensor and an output signal from the switch, wherein:
   the vehicle steering system is a vehicle steering system in which there is no mechanical connection between the steering member operated for steering and a steering mechanism that changes the steered angle of the steered wheels, and the steering mechanism is driven by the steered system motor,
   in a state where a turning amount of the steering member from a turning angle of the steering member corresponding to the neutral position of the steered wheels is within a prescribed range, operation of the switch causes a neutral position return controller of the motor controller to control the steered system motor such that the steered angle of the steered wheels is changed toward a steered angle corresponding to the neutral position of the steered wheels, and
   in a state where the turning amount of the steering member is outside the prescribed range, the operation of the switch causes no change in the steered angle of the steered wheels.

2. The vehicle steering system according to claim 1, further comprising a steered angle detector that detects the steered angle of the steered wheels, wherein
   the neutral position return controller includes:
      a target steered angle setting unit that sets a target steered angle based on the steering angle detected by the steering angle sensor and the output signal from the switch, and
      a unit that controls the steered system motor such that the detected steered angle detected by the steered angle detector is equal to the target steered angle, and
   the target steered angle setting unit includes a unit that changes the target steered angle to a steered angle corresponding to a position closer to the neutral position of the steered wheels when the switch is operated in the state where the turning amount of the steering member from the turning angle of the steering member corresponding to the neutral position of the steered wheels is within the prescribed range.

3. The vehicle steering system according to claim 2, wherein the switch is disposed on the steering member.

4. A forklift comprising the vehicle steering system according to claim 3.

5. The vehicle steering system according to claim 2, wherein the switch is an automatic-return push-button switch.

6. A forklift comprising the vehicle steering system according to claim 5.

7. The vehicle steering system according to claim 2, wherein the switch is a strain sensor.

8. A forklift comprising the vehicle steering system according to claim 7.

9. The vehicle steering system according to claim 2, wherein the switch is an electrostatic sensor.

10. A forklift comprising the vehicle steering system according to claim 9.

11. The vehicle steering system according to claim 2, wherein the steering member is a circular turnable steering wheel.

12. The vehicle steering system according to claim 11, wherein the prescribed range of the turning amount of the steering member is a range from 360 degrees to 720 degrees or a range from −720 degrees to −360 degrees.

13. A forklift comprising the vehicle steering system according to claim 12.

14. A forklift comprising the vehicle steering system according to claim 11.

15. A forklift comprising the vehicle steering system according to claim 2.

16. The vehicle steering system according to claim 2, wherein the steered angle of the steered wheels is changed independently from operation of the steering member.

17. The vehicle steering system according to claim 2, wherein the target steered angle setting unit changes the target steered angle in accordance with the change of the steered angle of the steered wheels.

18. The vehicle steering system according to claim 2, wherein the target steered angle setting unit changes the target steered angle based on the angle of integral multiple of the steering angle of the steering member detected by the steering angle sensor.

19. A forklift comprising the vehicle steering system according to claim 1.

20. The vehicle steering system according to claim 1, wherein the steered angle of the steered wheels is changed based on the angle of integral multiple of the steering angle of the steering member detected by the steering angle sensor.

21. The vehicle steering system according to claim 1, wherein the direction of the change of the steered angle of the steered wheels caused by the operation of the switch changes depending on the direction of rotation from the turning angle of the steering member corresponding to the neutral position to the steering angle of the steering member detected by the steering angle sensor.

* * * * *